(12) United States Patent
Chen

(10) Patent No.: US 6,363,983 B1
(45) Date of Patent: Apr. 2, 2002

(54) TIRE STRUCTURE

(76) Inventor: Yu-Fu Chen, No. 49, U Twu Ku, Lin9, Yeong Fu Li, Dah Shi City, Taoyuan (TW)

( * ) Notice: Subject to any disclaimer, the term of this patent is extended or adjusted under 35 U.S.C. 154(b) by 0 days.

(21) Appl. No.: 09/563,229

(22) Filed: May 2, 2000

(51) Int. Cl.[7] ............................ B60C 27/00; B60C 7/22; B60C 9/00
(52) U.S. Cl. ........................ 152/197; 152/198; 152/199; 152/458
(58) Field of Search ................................ 152/170, 172, 152/173, 175, 176, 185, 185.1, 187, 188, 192, 193, 194, 197, 198, 199, 450, 451, 458

(56) References Cited

U.S. PATENT DOCUMENTS

| | | | | |
|---|---|---|---|---|
| 880,274 A | * | 2/1908 | Brophy | 152/172 |
| 969,722 A | * | 9/1910 | Pitman | 152/170 |
| 1,416,049 A | * | 5/1922 | Moran | 152/199 |
| 1,431,069 A | * | 10/1922 | Ward | 152/199 |
| 2,777,497 A | * | 1/1957 | Hildebrant | 152/175 |
| 3,783,924 A | * | 1/1974 | Pelletier | 152/170 |
| 3,815,651 A | * | 6/1974 | Neal | 152/187 |
| 5,817,197 A | * | 10/1998 | Mani | 152/199 |

* cited by examiner

Primary Examiner—S. Joseph Morano
Assistant Examiner—Jason R. Bellinger
(74) Attorney, Agent, or Firm—Rosenberg, Klein & Lee

(57) ABSTRACT

The invention herein relates to an improved tire structure comprised of a plurality of thin steel plates crisscrossingly arranged in the thick portion of a tire surface and an assembly of cover tire installed around the surface of said tire; the plurality of up and down crisscrossingly arranged thin steel plates form a shield along the circumference of tire that removes the worry of the tire being punctured by sharp objects on the roads when the vehicle travels, thus enhancing driving safety; the cover tire can be replaced after it is worn out without the need to change the whole tire, thus effectively reducing the consumption of rubber for tire production that makes the invention herein both economical and environmentally friendly.

4 Claims, 5 Drawing Sheets

TIRE STRUCTURE

BACKGROUND OF THE INVENTION

1. Field of the Invention

The invention herein relates to an improved tire structure, particularly a kind that is simple in construction and easy to install, and can protect the tire from puncture, thus making driving safer, and effectively reduce the consumption of rubber, making it environmentally friendly and economical. The invention is in essence practical, ideal, progressive and innovative.

2. Description of the Related Art

The construction of regular tires comes in two styles. The first one, as shown in FIG. 1, is to mount rubber tire 1 on rim 2 and air fills inside tire 1 directly; the second one is to mount a band of rubber over the rim, and then arrange a rubber tube inside for accommodating air. Given the excellent properties of traction, wear-resistance and elasticity of rubber material, the aforesaid tires are arranged in such a way that they are in direct contact with ground surface, and undeniably, provide considerable comfort, speed and safety in driving. But in practical application, such tire construction also have some shortcomings:

1. Rubber cannot fend off sharp objects. Thus tires made of rubber that is either directly inflated or inflated through a rubber tube inside are susceptible to puncture by screws, nails or other hard, sharp objects scattered on the roads where vehicles travel. Punctured tire endangers driving safety, particularly when the car is carrying heavy load or traveling in high speed that it may flip over due to instantaneous deflation of tire.

2. Regular tire, be it inflated directly or through a rubber tube, is made of rubber and steel wires. When its treads are worn to a certain extent, the entire tire must be scrapped without the possibility of retreading. The remaining rubber cannot be re-utilized either. Moreover, to give tire surface certain thickness and strength, treads cannot be made too deep to begin with, which tends to necessitate tire change more frequently.

3. Rubber is not prone to decay. Its recycling and re-processing are complicated, tedious and costly. Thus the majority of used tires are not recycled, but scrapped. They are often randomly discarded and left unattended that produces an adverse impact on the environment. The pool of standing water in the inner trough of tire provides ground for propagation of disease vectors.

Thus the construction of regular tires has some shortcomings that can be improved in practical application.

SUMMARY OF THE INVENTION

The objective of the invention herein is to provide an improved tire structure, wherein a shield is formed along the circumference of tire by arranging a plurality of thin steel plates up and down crisscrossingly disposed in the thick portion of tire surface that can protect the tire from being punctured by sharp objects scattered on road surface during driving, thus enhancing driving safety.

Another object of the invention herein is to provide an improved tire structure wherein a cover tire is mounted around the outer surface of tire that is replaceable after it is worn out without the need to change the entire tire. Under the circumstances where the tire is not consumed or minimally consumed, the invention herein provides both economy and practical application.

Furthermore, the invention herein aims to provide an improved tire structure wherein by arranging the tread of said cover tire deeper and fully utilizing the cover tire, the consumption of rubber is reduced. More so, with the residual rubber on the waste cover tire being reduced, its subsequent disposal is made simpler and economical. Naturally, it is also an improvement over the situation where used tires of prior art are often randomly discarded or piled up that tends to breed the growth of disease vectors.

Another objective of the invention herein is to provide an improved tire structure wherein a plurality of crisscrossingly arranged thin steel plates disposed in the thick portion of tire surface can effectively prevent the puncture of tire by sharp objects on the road. Moreover, when the cover fire mounted around the outer surface of tire contacts protruded objects on the road, said crisscrossinly arranged thin plates can be squeezed inward along with the action of rubber without even slighfly affecting the elastic action of tire.

DETAILED DESCRIPTION OF THE PREFERRED EMBODIMENT

Figure 1:
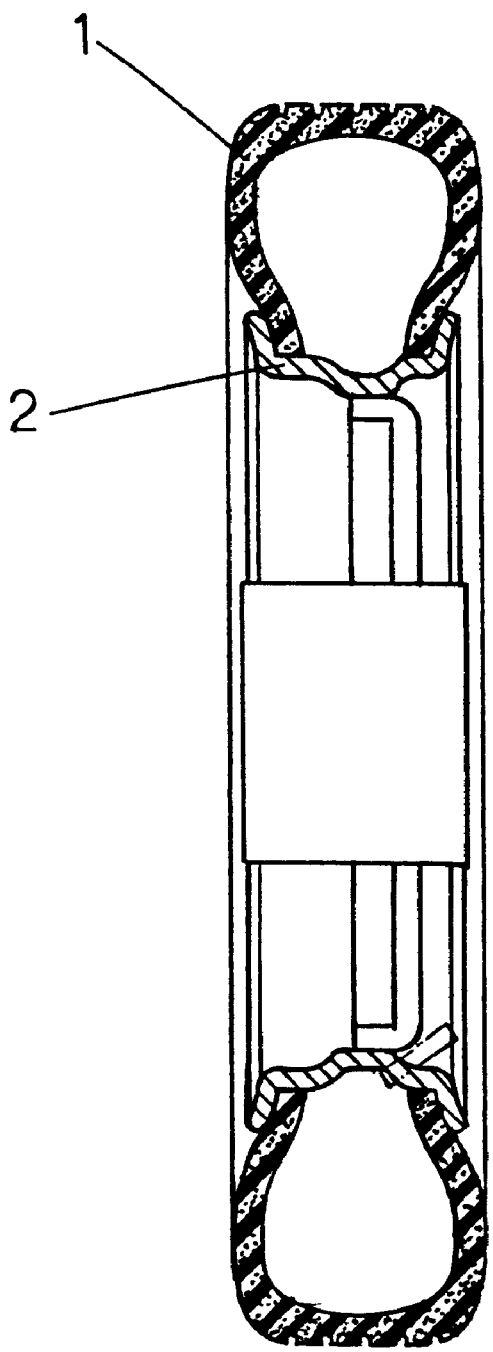
FIG. 1 is a cross-sectional drawing of a conventional tire mounted on steel
Figure 3:
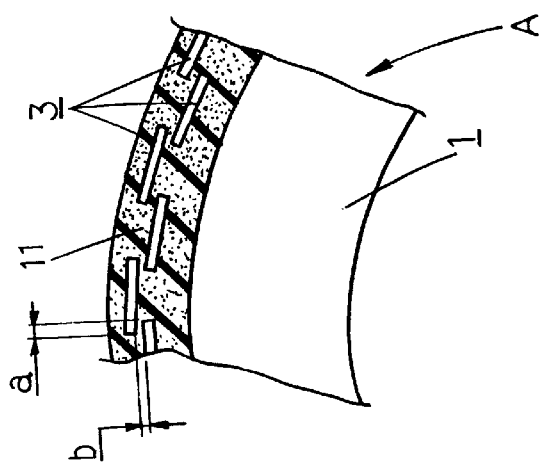
FIG. 3 is a magnified drawing of section A as shown in FIG. 2.
Figure 2:
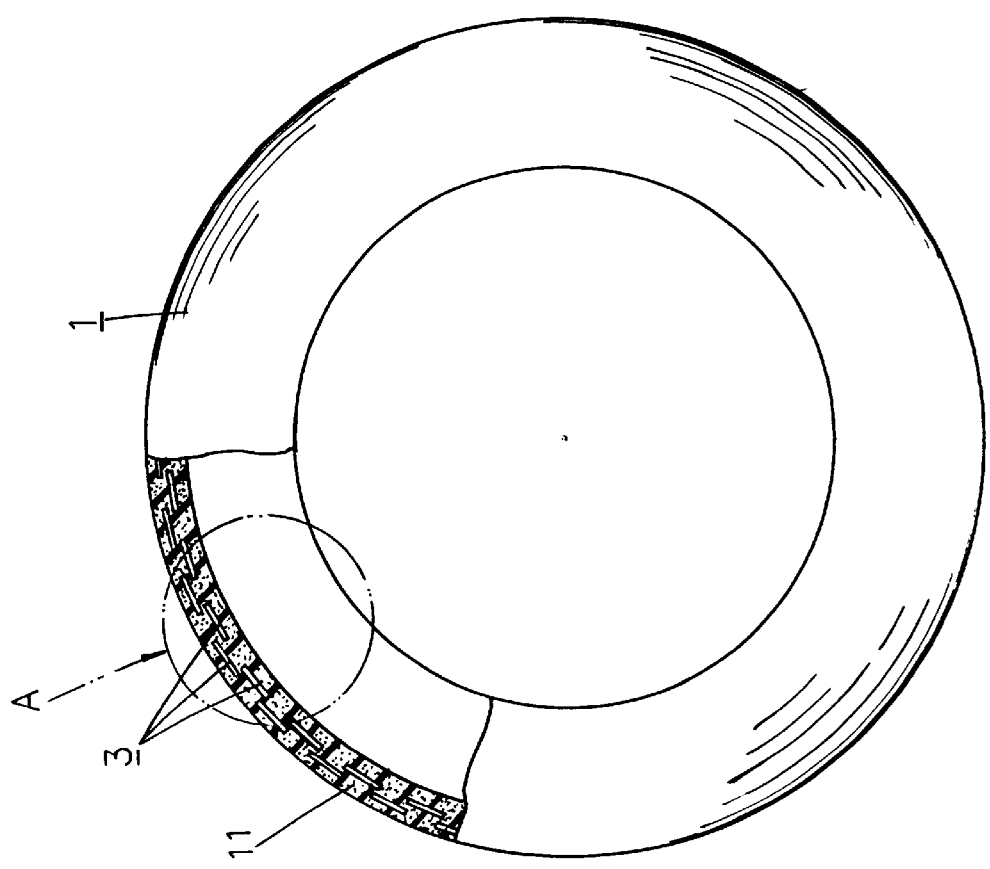
FIG. 2 is a partial dissectional drawing of the preferred embodiment of the invention herein, viewed from the front.
Figure 4:
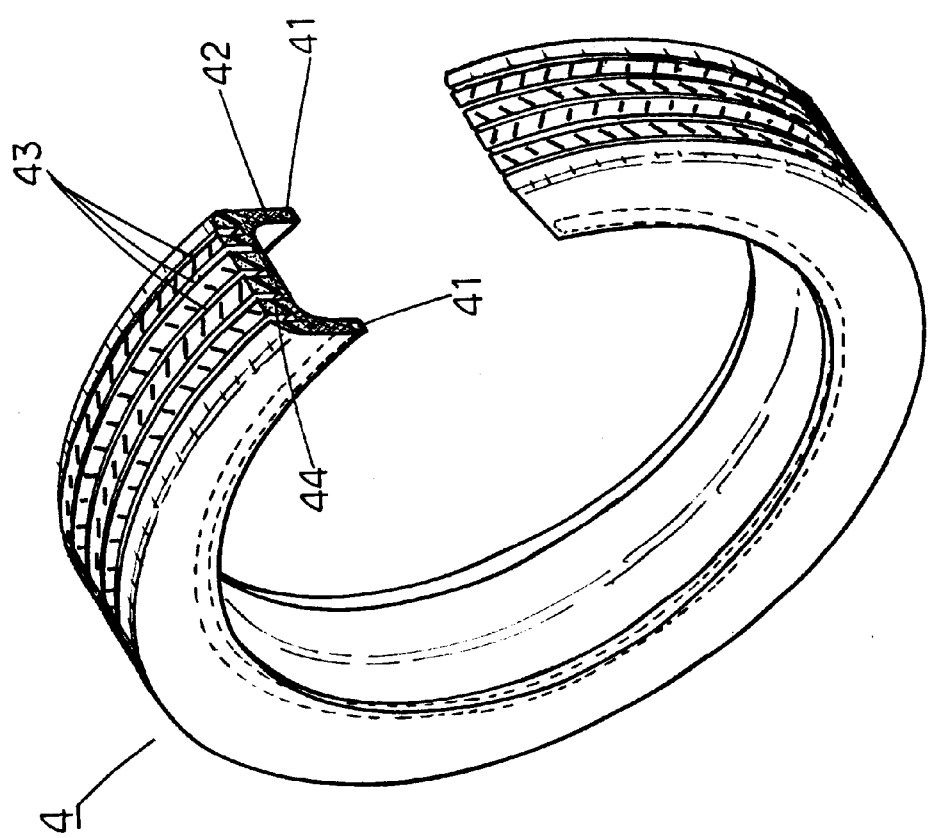
FIG. 4 is a three-dimensional drawing of the preferred embodiment of the invention herein.
Figure 6:
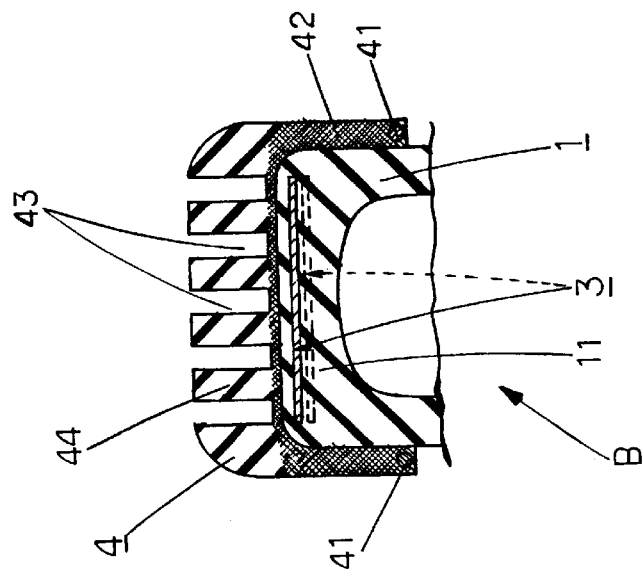
FIG. 6 is a magnified drawing of section B as shown in FIG. 5.
Figure 5:
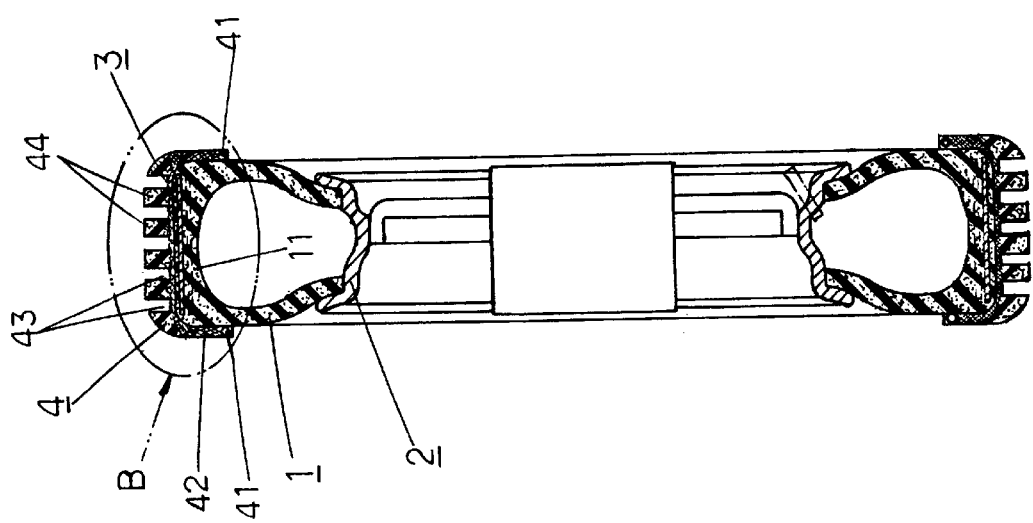
FIG. 5 is a cross-sectional drawing of tire and cover tire of the invention herein mounted over the rim.

Referring to FIG. 2, FIG. 3, FIG. 4, FIG. 5 and FIG. 6, the preferred embodiment of the invention herein is an improved tire structure, comprised mainly of a plurality of thin steel plates 3 up and down crisscrossingly arranged on the thick portion 11 of the surface of rubber tube or air-accommodating tire 1 that forms a shield along the circumference of tire 1, and an assembly of cover tire 4 mounted over the outer surface of tire 1.

Said plurality of thin steel plates 3 crisscrossingly arranged in the thick portion of tire 1 can be embedded inside tire 1 during its production, or slots (not shown in the diagrams) for accommodating thin steel plates 3 can be reserved on the thick portion 11 of tire surface during the production of tire 1 and thin steel plates 3 are inserted and positioned into those slots respectively after the tire is made. The pluality of thin steel plates 3 are arranged in such a way that they each have an overlap section a with another plate at both ends, and each overlap section a is not in contact with each other, but spaced apart by a rubber thickness b. Said up and down crisscrossingly arranged thin steel plates disposed along the circumference of tire 1 forms directly a shield that prevents puncture by sharp objects, such as screws and nails. Given that the overlap section a at both ends of each thin steel plate 3 is spaced apart by rubber thickness b from that of another steel plate, tire 1 still retains its intrinsic elastic action.

Cover tire 4 is configured according to the construction of tire 1 and slightly smaller. It is roughly ∩-shaped so it can be mounted directly over the surface of tire 1. The inner margin at both sides of cover tire is respectively encircled with a steel strip 41, and netted thin wires or nylon yarns 42 are disposed between two steel strips 41. Given the excellent cross-sectional strength of cover tire, it won't become detached from tire 1 when the vehicle is traveling. Moreover, the coordinating friction of rubber between tire 1 and cover tire 4 makes their union more stable and secure.

As described above, the up and down crisscrossing thin steel plates 3 arranged in the thick portion 11 of the surface of tire 1 forms a shield along the circumference of tire 1 and directly fends off sharp objects, such as nails. With cover tire 4 mounted over tire 1, the surface of tire 1 is not susceptible to puncture by sharp objects scattered on the roads when the vehicle travels, thus enhancing driving safety. In addition, with thin steel plates disposed around tire 1 providing a shield that keeps tire 1 from puncture or wear, the treads 43 over the surface of cover tire 4 can be made deeper and in close proximity to thin wire net 42, rendering the entire rubber ply 44 of cover tire 4 fully utilized and extending the service life of cover tire 4. Also, cover tire 4 can be replaced once rubber ply 44 is worn out without the need to change tire 1, which saves considerably the consumption of rubber in comparison with the need to change the whole tire as known in prior art, making the invention herein both an economical and environmentally friendly option. Moreover, with anti-skid treads 43 being made deeper, the residual rubber on the waste cover tire is also less, making the disposal of waste rubber much easier, economical and practical. Naturally, it is also an immediate improvement over the fact that used tires of prior art are often randomly discarded or piled up that is an affront to the environment and becomes a breeding ground for disease vectors.

Figure 7:
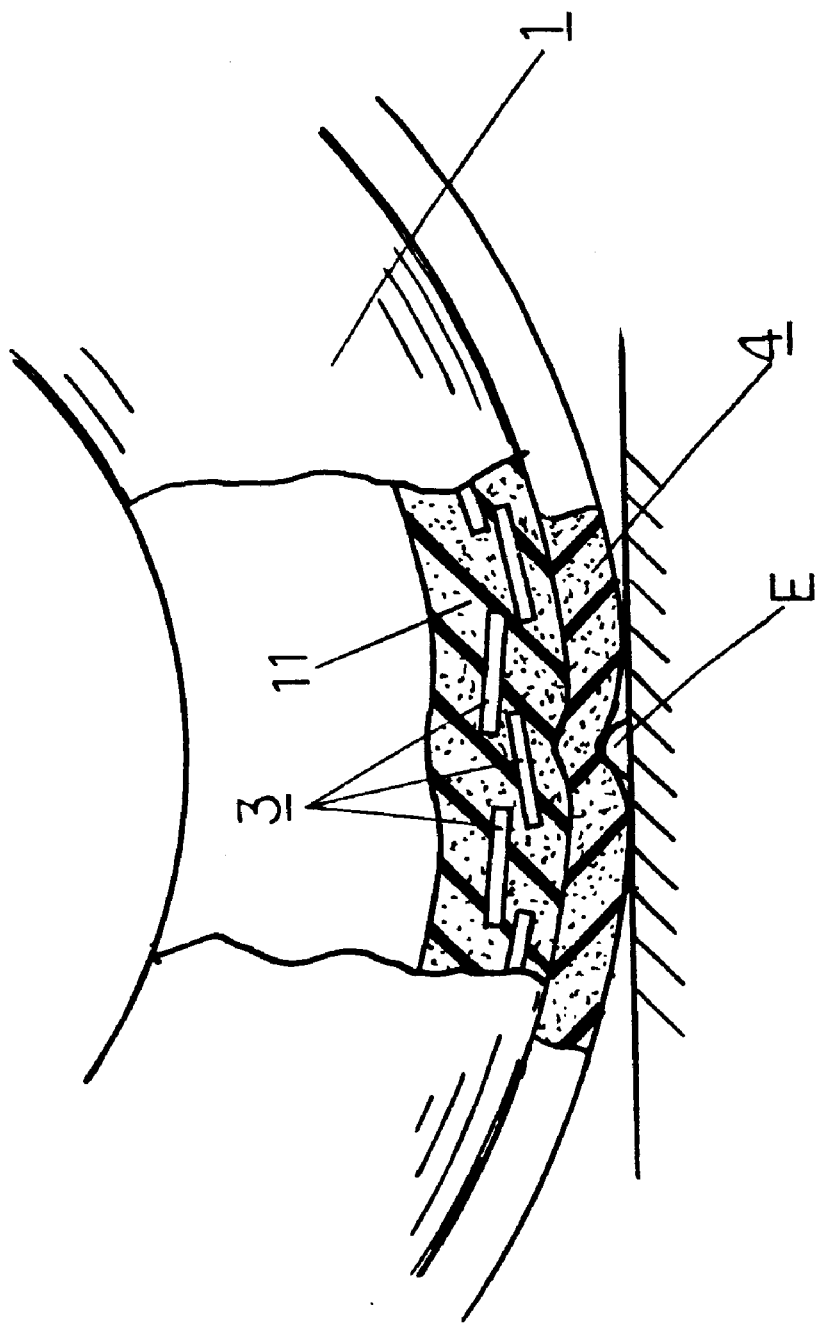
FIG. 7 is a dissectional drawing of the preferred embodiment of the invention in contact with protruding object on the ground.

Referring to FIG. 7, thin steel plates 3 which are up and down crisscrossingly arranged in the thick portion 11 of surface of tire 1 and spaced apart by a rubber thickness b at their overlap sections a without direct contact or connecting into one piece. Thus besides forming a shield around tire 1 to protect the tire from puncture and wear out, these thin steel plates are squeezed inward along with the action of rubber when cover tire 4 mounted over tire 1 is in contact with protruded object E on the ground without even slightly affecting the elastic action of tire. Also, due to the fact that each steel plate is thin and embedded completely in the thick portion 11 of tire surface, it won't cause deformation of tire or affect its normal use.

What is claimed is:

1. A tire structure comprising:
   (a) an inner tire including:
      an annularly extending thick portion formed of a rubber material, said thick portion having a transversely directed intermediate width; and,
      a plurality of shielding thin steel plate members each disposed in said thick portion to traverse said intermediate width thereof, adjacent ones of said thin steel plate members being radially spaced one from the other in overlapping offset manner; and,
   (b) a cover tire separably coupled to said inner tire to substantially envelop said thick portion, said cover tire including:
      an annularly extending outer rubber ply portion and a pair of wall portions extending radially inward therefrom to define a pair of transversely spaced peripheral inner margins; and,
      an annular steel strip disposed in said peripheral inner margin of at least one said wall portion.

2. The structure as recited in claim 1 wherein said steel strip is disposed in each of said peripheral inner margins of said cover tire wall portions.

3. The structure as recited in claim 1 wherein said rubber ply portion defines a plurality of anti-skid treads.

4. The structure as recited in claim 1 wherein said rubber ply and wall portions of said cover tire define substantially an inverted U-shaped sectional contour and include a netted weave component.

* * * * *